June 30, 1970 G. R. HUGGETT ET AL 3,518,531

TRANSIENT SUPPRESSOR FOR USE IN MAGNETOMETER READOUT CIRCUITS

Filed Feb. 23, 1968 2 Sheets-Sheet 1

INVENTORS
GEORGE R. HUGGETT
RICHARD A. MC BRIDE
LARRY J. AUGUSTINE

BY

ATTORNEY

TRANSIENT SUPPRESSOR FOR USE IN MAGNETOMETER READOUT CIRCUITS

Filed Feb. 23, 1968 2 Sheets-Sheet 2

INVENTORS
GEORGE R. HUGGETT
RICHARD A. MC BRIDE
LARRY J. AUGUSTINE

BY [signature]

ATTORNEY

United States Patent Office 3,518,531
Patented June 30, 1970

3,518,531
TRANSIENT SUPPRESSOR FOR USE IN MAGNETOMETER READOUT CIRCUITS

George R. Huggett, Sunnyvale, Richard A. McBride, Palo Alto, and Larry J. Augustine, Mountain View, Calif., assignors to Varian Associates, Palo Alto, Calif., a corporation of California

Filed Feb. 23, 1968, Ser. No. 707,655
Int. Cl. G01r *33/08*
U.S. Cl. 324—.5 5 Claims

ABSTRACT OF THE DISCLOSURE

The readout circuit comprises in sequence a limiter, a square wave symmetry control circuit, a frequency discriminator and a transient suppressor. The frequency and amplitude modulated sinusoidal magnetometer signal is translated into square waves by the limiter. Since the amplitude modulation would cause the square waves to be asymmetrical and degrade the performance of the circuit, the square wave symmetry control circuit generates an error signal which is used to eliminate the effects of amplitude modulation. The frequency discriminator produces an output signal which varies in accordance with the input frequency from the magnetometer. This output signal when plotted against input frequency comprises a ramp or sawtooth, with a period of 1000 Hz., such that the sawtooth repeats for each 1000 Hz. increment of input frequency. A second phase detector produces an identical sawtooth output shifted in frequency by 500 Hz. with respect to the first. A logic switch sensitive to the amplitude of each of the sawtooth waves switches the following circuits between the frequency discriminator outputs to avoid signal distortions which develop at the transition points of the sawtooth waves. A transient suppressor prevents transients from saturating the following filter circuits when different D.C. levels exist on the discriminator outputs at the time of switching. By feeding back the signal being monitored to the output of the unused channel of the frequency discriminator, the same signal is forced to be present on both channels when switching takes place.

CROSS-REFERENCES TO RELATED APPLICATIONS

The subject matter disclosed herein comprises as well the subject matter of copending U.S. application Ser. No. 707,686 filed Feb. 23, 1968, entitled, Square Wave Symmetry Control Circuit for Use in Magnetometer Readout Apparatus, and U.S. application Ser. No. 707,689, filed Feb. 23, 1968, entitled, Frequency Discriminator for Use in Magnetometer Readout Apparatus, both assigned to the same assignee as the instant application.

BACKGROUND OF THE INVENTION

The present invention relates in general to magnetometer readout apparatus and in particular, to a novel transient suppressor for preventing signal distortion in monitoring circuits.

A magnetometer used for measuring magnetic field intensity frequently produces a signal exhibiting a frequency as a function of field intensity. The signal is transformed into a square wave signal which is further transformed by means of a frequency discriminator into a D.C. signal the amplitude of which varies as a function of the frequency of the signal obtained from the magnetometer. In systems wherein the monitoring circuits are selectively shifted to alternative outputs of preceding stages, such as a frequency discriminator or the like, differing D.C. and A.C. levels on the outputs will generate transients such as will cause distortion and saturation of the input monitoring circuit elements, for example, filters.

SUMMARY OF THE INVENTION

In accordance with the present invention, a transient suppressor is provided between the output of a frequency discriminator and the input of a high pass filter which comprises the input circuit element to following stages of the monitoring circuits.

The frequency discriminator provides output signals on a pair of output lines similar in form, but shifted in frequency by $1/2\tau$ Hz. relative to each other. As a function of frequency, the signals take the form of a sawtooth. When the amplitude of the sawtooth signal being monitored on one line reaches a predetermined level, such as 75% of the maximum, an amplitude sensitive switch controlling a relay shifts the monitoring circuits to the other output. Since the input monitoring circuit element is a high pass filter, any difference in the A.C. and D.C. levels on the outputs at the time of switching will give rise to transients which will tend to distort the signal in the filter. To prevent distortion in the filter under these circumstances, the input capacitor to the filter in one embodiment is split between the two outputs of the preceding frequency discriminator. Depending on the amplitude of the signal, the output of one or the other of the capacitors is coupled to the filter. At the time of switching, a unit gain feedback amplifier is coupled to the unused capacitor for driving the latter's ouput with the same signal as the used capacitor. In order to reduce the time lag of signals generated by the frequency discriminator, the unused capacitor is loaded by a low resistance, such as 1K ohms, to ground coupled to the ouput of the feedback amplifier.

In another embodiment, a high input impedance unity gain operational amplifier may be placed in series with the used capacitor and the filter input. The output of the operational amplifier is then used as the input to the feedback amplifier. To prevent buildup of saturating D.C. voltage in the following operational amplifier, a large resistor, such as 300K ohms, is provided at the input to the amplifier.

Accordingly, a primary object of the present invention is apparatus for supressing transients and preventing distortion in a magnetometer readout circuit.

Another object of the present invention is apparatus for suppressing transients which saturate and distort the signal in monitoring circuits when the input to said monitoring circuits is switched to different signal sources.

Another object of the present invention is a transient suppressor as described which drives the output of the signal source not being monitored with the signal being monitored.

Another object of the present invention is a transient suppressor as described which uses a unity gain amplifier having an input coupled to the signal source being monitored and an output coupled to the signal source not being monitored to insure that the signal on the output of both sources is always the same.

Other objects, features and advantages of the present invention will become apparent in the following detailed description when considered together with the accompanying drawings in which.

Figure 1:
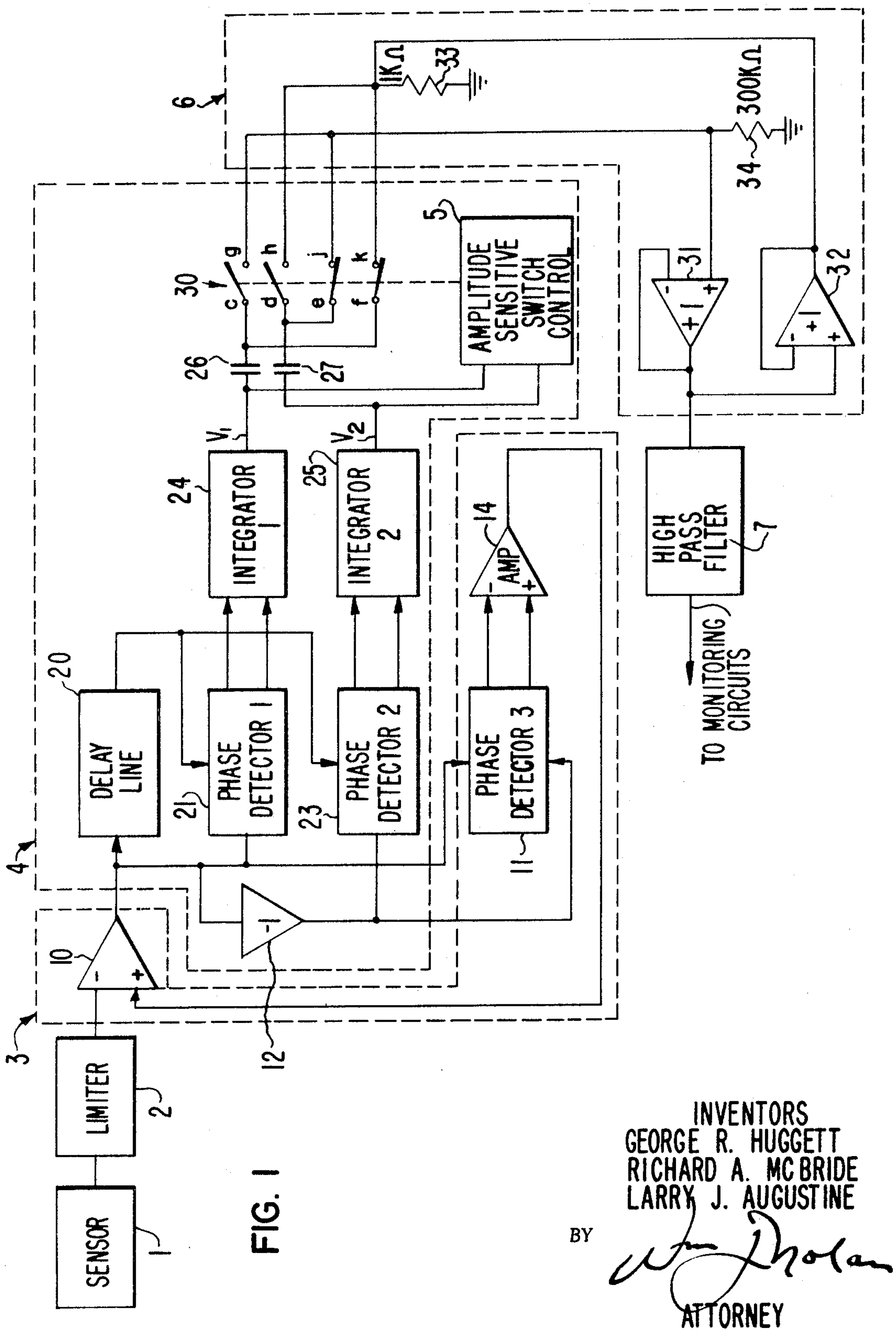
FIG. 1 is a block diagram of the circuit embodying the present invention.

In FIG. 1, there is shown a magnetometer readout apparatus embodying the present invention. A sensor 1, such as a magnetometer, and a limiter 2 are coupled to a square wave symmetry control circuit 3. The square wave symmetry control circuit 3 provides symmetrical square waves or pulses to a frequency discriminator 4. The output of frequency discriminator 4 is coupled by means of an amplitude sensitive switch 5 to a transient suppressor 6. The output of transient suppressor 6 provides, in turn, a useable transient and distortion free signal to a high pass filter 7 which functions as the input element for following monitoring circuits (not shown).

Sensor 1, which may be, for example, an alkali vapor magnetometer, provides a precession signal in the form of a sine wave the frequency of which is directly proportioned to the intensity of a magnetic field being measured. The precission signal, in addition to frequency modulation, also exhibits amplitude modulation which may range from .5 volt to 5 volts peak-to-peak.

Limiter 2, which functions to transform the precession sine wave signal into a representative square wave signal, produces square waves which are caused to be asymmetrical as a result of the amplitude modulation of the precession signal. For reasons given presently, the asymmetry of the limiter 2 output square waves is reflected in the output of frequency discriminator 4 in the form of phase jitter. The square wave symmetry control circuit 3, is provided, therefore, between limiter 2 and frequency discriminator 4 to eliminate the phase jitter by phase comparing the leading and lagging edges of each of the square waves received from limiter 2 by generating therefrom a compensating error signal.

Frequency discriminator 4 is adapted to receive and phase compare to itself each of the square waves from square wave symmetry control circuit 3 after each has been delayed a predetermined number of microseconds $\tau$. As will be described more fully with respect to FIG. 3, the resulting outputs of frequency discriminator 4 are two channels or output signals of D.C. voltage levels which vary as a function of the frequency of the sine wave signal from sensor 1. Over the entire frequency range of interest the D.C. voltage levels take the form of a sawtooth the period of which is determined by the delay $\tau$ and is equal to a frequency change of $1/\tau$ Hz. The ramp or sawtooth signals provided on each of the two output channels, say, channel 1 and channel 2, of frequency discriminator 4 are effectively offset by $1/2\tau$ Hz. with respect to each other and coupled by means of amplitude sensitive switch 5 to transient suppressor 6.

Figure 3:
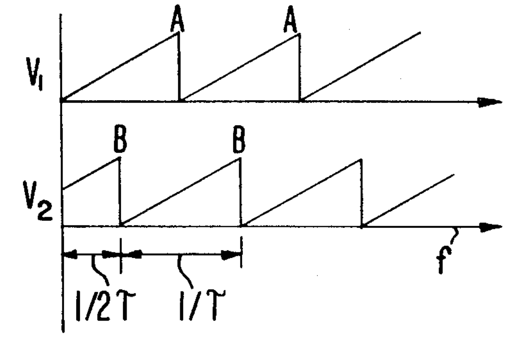
FIG. 3 is a diagram of the sawtooth voltage output of the frequency discriminator.
Figure 4:
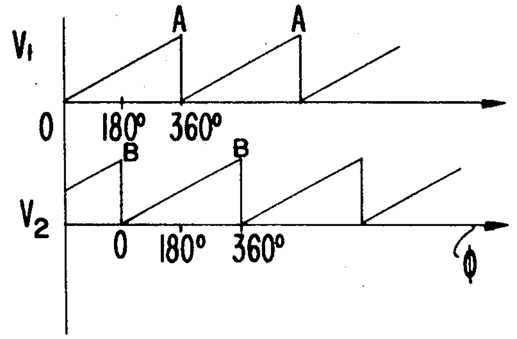
FIG. 4 is a diagram of the sawtooth voltage output signals of FIG. 3 in terms of relative phase angle.

Amplitude sensitive switch 5 detects the amplitude of each of the ramp signals and switches transient suppressor 6 from one channel to the other when the amplitude of the ramp on the channel being monitored reaches a predetermined level, say 75 percent of the maximum. By switching before the ramp being monitored reaches maximum, the large change in D.C. voltage at the transition points A and B as shown in FIG. 3 will only distort the signal in the channel not being monitored.

While the distortion at the transition points may be thus avoided, a difference in the D.C. and A.C. level between channels 1 and 2 at the time of switching will still result in saturation of the high pass filter 7. To avoid this source of saturation and the resultant signal distortion in the high pass filter 7, the transient suppressor 6 is coupled between amplitude sensitive switch 5 and high pass filter 7. By monitoring the signal being delivered to high pass filter 7 and feeding it back in phase to the output of the channel not then being monitored, transient suppressor 6 forces the high pass filter 7 to "see" the same D.C. and A.C. level on both channels at the time switching takes place.

Referring now to FIGS. 1, 2, 3 and 4, a detailed discussion of the circuits will now be undertaken.

Limiter 2, consisting of seven stages of gain-limiting amplifiers puts out a square wave the leading and lagging edges of which vary in relation to each other as a function of the amplitude of the incoming sine wave precession signal. This is due to the fact that the transistors comprising the limiter 2 "turn-on" and "turn-off" at specified input signal levels. Thus, the transistor will be turned-on sooner and turned-off later for high amplitude signals than for low amplitude signals of the same frequency.

To correct the asymmetry of the square wave thus produced, there is provided a differential comparator 10 the inverting input (−) of which is coupled to the output of limiter 2. The output of comparator 10 is coupled to the inputs of flip-flop linear phase detector 11 directly and through an inverter 12, respectively. Since phase detector 11 is designed to operate on positive going pulses, the result is that the leading and lagging edges of the square waves are compared. The net result is that phase detector 11 provides a zero output when the inputs are 180 degrees out of phase and a non-zero output when any other relationship exists. The error signal at the output of phase detector 11 is then amplified in an amplifier 14 and applied to the non inverting input of comparator 10 for controlling its switching point. The resulting symmetrical square waves are then coupled to the frequency discriminator 4.

Figure 2:
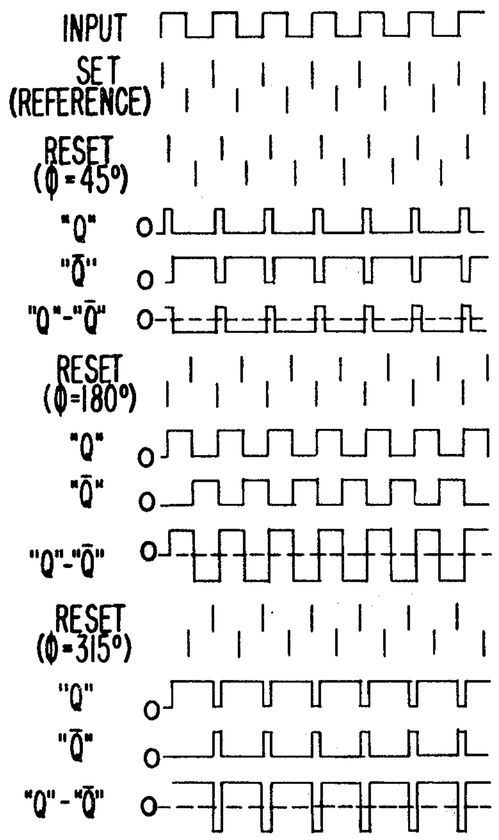
FIG. 2 is a pulse diagram of the input and output voltage associated with one of the frequency discriminator phase detectors.

As shown in FIG. 1, the square waves from square wave symmetry control circuit 3 are applied simultaneously to the inputs of a delay network 20, a first linear phase detector 21 and the inverter 12 discussed above with respect to symmetry control circuit 3. The output of inverter 12 is coupled to a second linear phase detector 23. The output of delay network 20, for example, a magnetostrictive delay line, is coupled to both phase detector 21 and 23 to reference both phase detectors to the same signal. Both phase detectors 21, 23 are preferably flip-flops and preferably, the delayed signal is applied to their respective reset inputs. It should be understood, however, that the set inputs could be used as well. As shown in FIG. 2 which shows the input and output pulses for one of the phase detectors, a phase detector is set on the leading edge of a positive going pulse. Phase detector 21 is set on the leading edge of the pulses from square wave symmetry control circuit 3, whereas, due to inverter 12, phase detector 23 is set on the trailing edge. Since both phase detectors 21 and 23 are reset a time $\tau$ later by the leading edge of the same pulse, it is apparent that any change in asymmetry between the leading and trailing edges of the square waves would be reflected as phase jitter between the inputs of phase detector 23. This phase jitter is eliminated by square wave symmetry control circuit 3 as heretofore discussed. In series with and coupled to the outputs of phase detectors 21, 23, respectively, are provided a pair of integrators 24, 25, and a pair of D.C. blocking capacitors 26, 27. Integrators 24, 25 integrate the outputs of phase detectors 21, 23, respectively, yielding, as shown in FIG. 3, an output that has a sawtooth wave form as a function of frequency.

The two sawtooth wave forms as shown in FIG. 3 are repetitive in 1 kHz. increments of the input signal where the delay $\tau$ provided by delay network 20 is 1000 microseconds and can be expressed mathematically as $$V_{out}=-V+K(f-f_L)\pm\frac{mK}{2}(1000),\ -V<V_{out}<V$$

where $V_{out}$ is output D.C. voltage, K is the gain constant in volts/Hz., $f_L$ is the input frequency to the nearest lowest thousand, $f$ is the input frequency, $m$ is 0, 1 and $|V|$ is the D.C. limit on the output. The 1 kHz. increments of the output sawtooth signal are thus equal to the reciprocal of the predetermined delay $\tau$ which for purposes of illustration is assumed to be 1000 microseconds.

In terms of a sine function, the inputs to the set and reset of the phase detector 21 or phase detector 23 are sin $(\omega t-\omega\tau)$, respectively, where $\omega\tau$ represents the phase shift of the delay network 20 as a function of frequency where the points of discontinuity A and B as shown in FIG. 3 can be seen to occur at $\omega\tau=2\pi$ radians or $f=1/\tau$ Hz. and thus, as the frequency varies, the phase relationship varies so that different D.C. voltages are obtained as a function of frequency.

Referring again to FIG. 2, there is shown a typical pulse diagram disclosing the $\overline{Q}$ and $\overline{Q}$ outputs of one of the phase detectors, for three different phase relationships, i.e., $\omega\tau=45°$, 180° and 315°. In practice, the phase detector output is taken between Q and $\overline{Q}$ and applied to the input of its associated integrator. The output of the integrator is, as indicated, in the form of a sawtooth. Without regard to polarity, it can be seen by reference to FIG. 4 that the phase detector output voltage and accordingly, the associated integrator output voltage is a minimum at 0° and a maximum at 360°. Zero output voltage is obtained at 180°.

While similar in form, the outputs of integrators 24, 25 are, as noted in FIG. 3, displaced as a function of frequency by $1/2\tau$ Hz. relative to each other. This apparent ½ cycle shift is brought about by referencing both phase detectors 21, 23 with the signal from delay network 20 and triggering each detector with the leading and lagging edge of the input pulse from square wave symmetry control circuit, respectively.

The relative phase dispacement of the output sawtooth wave forms is used to avoid the discontinuities and resulting distortion which arise at the transition points A and B as shown in FIG. 3.

Referring to FIG. 1, the outputs of capacitors 26, 27 are alternatively or successively coupled to transient suppressor 6 and high pass filter 7 by means of a double-pole, double-throw relay 30 controlled by amplitude sensitive switch 5. In a first position, relay 30 passes the signal from capacitor 26 via pole $c$ and contact $g$ to transient suppressor 6. In a second position, relay 30 passes the signal from capacitor 27 via pole $e$ and contact $j$ to transient suppressor 6. The signal to be passed is determined by the amplitude of the signal as measured at the output of integrators 24, 25 by amplitude sensitive switch 5.

In practice, switching is effected from one output to the other when the output being monitored reaches 75 percent of its maximum. Accordingly, the distortion which occurs at transition points A and B as shown in FIG. 3 will not be monitored.

Transient suppressor 6, in addition to passing the signal from either capacitor 26 or 27 to high pass filter 7, provides also for the elimination of transients due to differing D.C. and A.C. levels on the outputs of capacitors 26, 27 at the time of switching caused by the different load impedances of each channel, one represented by resistor 34 being 300K ohms and the other represented by resistor 33 being 1K ohm. The 1K ohm load insures rapid decay of transients which may be generated in the unused channel, say at points A or B in FIG. 3. The 300K ohms load is connected to contact $g$ or $j$ of relay 30 for receiving the signal from either capacitor 26 or 27 depending on the position of relay 30. A unity gain feedback amplifier 32 together with its low impedance output resistor 33, of say 1K ohm is coupled to the output of amplifier 31 for feeding back to the output of the capacitor not being monitored via contacts $h$ and $k$ the same signal in both amplitude and phase as that being monitored. The signal on the output of the unused capacitor is the same as that passed to high pass filter 7 due to the relative values of the resistors 33 and 34, that is, 1K ohm and 300K ohms such that the signal feedback is much larger than the signal from the frequency discriminator 4 at the output of the unused capacitor. The result is that when switching occurs, the signal received by high pass filter 7 is the same as that which existed on the output of the capacitor which was being monitored at the time of switching. In order to reduce time lag in signals generated by the frequency discriminator 4, the unused capacitor is loaded by the low resistance 33 to ground coupled to the output of the feedback amplifier 32. Since the signal received by high pass filter 7 is the same regardless of which of the outputs of capacitors 26, 27 is being monitored, the signal to high pass filter 7 is not distorted, does not ring and consequently no information is lost and no switching transients are recorded.

Figure 5:
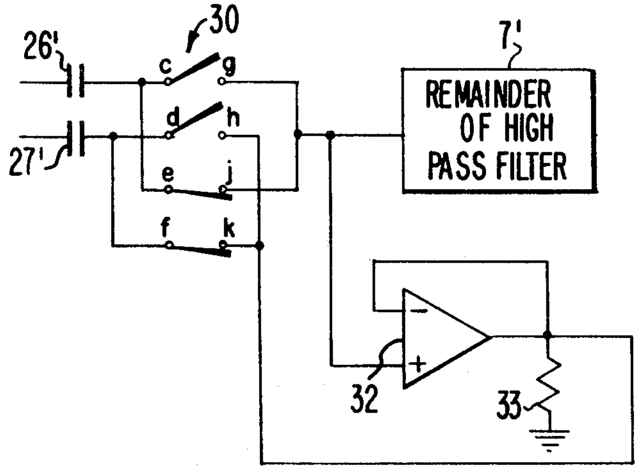
FIG. 5 is a partial schematic diagram of an alternative embodiment of the apparatus embodying the present invention.

Alternatively, as shown in FIG. 5, amplifier 31 may be omitted and high pass filter 7 connected directly to contacts $g$ and $j$ of relay 30. In that event, capacitors 26 and 27 will be replaced by capacitors 26' and 27', in practice, the input capacitor of high pass filter 7, now 7', split between the two outputs of frequency discriminator 4. In this case, as before, the input impedance of the remainder of the high pass filter 7' is much higher than 1K ohm.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A magnetometer readout circuit comprising an output circuit, a preceding circuit element, switching means to couple said output circuit to a first and a second output of said preceding circuit element, and a transient suppressor comprising:

a feedback amplifier coupled to the input of said output circuit; and means coupling the output of said feedback amplifier to said second output of said preceding circuit element when said output circuit is coupled to said first output of said preceding circuit element; and means coupling the output of said feedback amplifier to said first output of said preceding circuit element when said output circuit is coupled to said second output of said preceding circuit element whereby substantially the same signal will be applied to said output circuit when said output circuit is switched from either said first to said second output or from said second to said first output of said preceding circuit element.

2. A transient suppressor according to claim 1 wherein said preceding circuit element is a dual output frequency discriminator and said output circuit element is a high pass filter.

3. A transient suppressor according to claim 2 wherein said feedback amplifier is a unity gain operational amplifier.

4. A magnetometer readout circuit comprising an output circuit, a preceding circuit element, switching means coupling said output circuit to a first or a second output of said preceding circuit element, and a transient suppressor comprising a first amplifier means coupled to said output circuit for providing a signal to said output circuit, a second amplifier means coupled to the output of said first amplifier means and said output circuit for providing a feedback signal; switch means connected to the input of said first amplifier means and the output of said second amplifier means for selectively coupling, in a first position, said first and said second amplifier means to said first and said second output of said preceding circuit element, respectively, and in a second position, said first and said second amplifier means to said second and said first output of said preceding circuit element respectively, whereby the magnitude of the signal applied to said first amplifier means is maintained substantially constant when said switch means changes between said first and said second position such that the signal applied to said output circuit will be free of distortion.

5. A transient suppressor according to claim 4 wherein said first and said second amplifier means are unity gain operational amplifiers.

References Cited

UNITED STATES PATENTS

| | | |
|---|---|---|
| 2,974,285 | 3/1961 | Schenck. |
| 3,090,002 | 5/1963 | Allen. |

ALFRED E. SMITH, Primary Examiner

U.S. Cl. X.R.

324—78; 328—165